(12) United States Patent
Leyre et al.

(10) Patent No.: US 7,745,768 B2
(45) Date of Patent: Jun. 29, 2010

(54) ABSOLUTE TARGET SYSTEM ENHANCED BY COMBINING A STAR SENSOR AND A FORMATION FLIGHT OPTICAL METROLOGICAL SENSOR

(75) Inventors: Xavier Leyre, Opio (FR); Bruno Napierala, Le Cannet (FR)

(73) Assignee: Thales (FR)

( * ) Notice: Subject to any disclaimer, the term of this patent is extended or adjusted under 35 U.S.C. 154(b) by 0 days.

(21) Appl. No.: 12/249,445

(22) Filed: Oct. 10, 2008

(65) Prior Publication Data
US 2009/0101793 A1    Apr. 23, 2009

(30) Foreign Application Priority Data
Oct. 19, 2007    (FR)    ................... 07 07336

(51) Int. Cl.
G02B 23/00    (2006.01)
(52) U.S. Cl. .............. 250/203.1; 250/203.3; 250/203.6; 244/171
(58) Field of Classification Search .............. 250/203.1, 250/203.3, 203.4, 203.6; 382/104
See application file for complete search history.

(56) References Cited

U.S. PATENT DOCUMENTS 5,107,434 A    4/1992    Paluszek
5,525,793 A *  6/1996    Holmes et al. ........... 250/203.6
5,745,869 A    4/1998    van Bezooijen
6,266,616 B1 * 7/2001    Needelman ................. 701/222

FOREIGN PATENT DOCUMENTS

| EP | 1362785 A1 | 11/2003 |
| FR | 2661261 A  | 10/1991 |
| FR | 2 902 894  | 12/2007 |
| WO | 9930444 A  | 6/1999  |

OTHER PUBLICATIONS

Wielders A et al: "Metrology Concepts for a Space Interferometer Mission: Smart-2" Proceedings of the SPIE, SPIE, Bellingham, VA, vol. 4852, (Feb. 1, 2003), pp. 268-278, XP002422676; ISSN: 0277-786X.
Carl Christian Liebe: "Accuracy Performance of Star Trackers-A Tutorial"; IEEE Transactions on Aerospace and Electronic Systems, vol. 38, No. 2, (Apr. 2002), pp. 587-599, XP002487699.

* cited by examiner

*Primary Examiner*—Georgia Y Epps
*Assistant Examiner*—Tony Ko
(74) *Attorney, Agent, or Firm*—Lowe Hauptman Ham & Berner, LLP

(57) ABSTRACT

The present invention relates to an absolute target system intended to be incorporated in observation satellites. To establish an absolute target system provided with maximum accuracy, the present invention proposes coupling a star sensor (4) to an optical metrological system (5N, 5R). Since these two items of equipment are normally already on board the satellites, in particular for formation flight missions, this solution adds no extra weight or cost.

8 Claims, 3 Drawing Sheets

ABSOLUTE TARGET SYSTEM ENHANCED BY COMBINING A STAR SENSOR AND A FORMATION FLIGHT OPTICAL METROLOGICAL SENSOR

RELATED APPLICATIONS

The present application is based on, and claims priority from, French Application Number 07 07336, filed Oct. 19, 2007 the disclosure of which is hereby incorporated by reference herein in its entirety.

FIELD OF THE INVENTION

The present invention relates to an absolute target system intended to be incorporated in observation satellites.

BACKGROUND OF THE INVENTION

Currently, in many space missions, and notably those requiring the flight in formation of several satellites, the required absolute pointing accuracy is very high. To carry out the absolute pointing of observation instruments on board satellites, star sensors, also called stellar sensors, are currently used. These conventional star sensors have catalogues of stars whose absolute position is known with great accuracy. However, the star sensors make it possible to point towards a known bright star only approximately, with an accuracy of the order of several seconds of arc.

Thus, for absolute target systems of the state of the art, even the most recent, it is impossible to achieve the absolute pointing accuracies required for the missions currently envisaged, for which the required accuracies are of the order of a tenth of a second of arc.

Furthermore, it is particularly difficult to accurately calibrate this type of instrument: the mechanical and thermoelastic biases induced by the incorporation and launch, and the thermal environment, being virtually impossible to calibrate.

Consequently, the commonly-sought solutions consist:
  either in developing new star sensors with the requisite accuracy, that is, less than a second of arc, but this involves heavy investments; furthermore, if such a solution did result in the development of a star sensor with the desired absolute accuracy, this would lead to a major extra cost and weight, which is not desirable, particularly for space applications,
  or in seeking to accurately measure the induced biases, but this is very difficult and the residues are in any case generally estimated at several seconds of arc.

One aim of the invention is notably to overcome the above-mentioned drawbacks. Thus, to create an absolute target system provided with a maximum accuracy, the present invention proposes coupling a star sensor to an optical metrological sensor. Since these two items of equipment are normally already on board the satellites, in particular for formation flight missions, this solution adds no extra weight or cost.

SUMMARY OF THE INVENTION

To this end, the subject of the invention is an absolute target system comprising a star sensor having a catalogue of stars listing a set of known bright stars, that is, stars whose absolute position is known, with a catalogue accuracy, characterized in that it further comprises an optical metrological sensor making it possible to accurately determine relative positions, with a measurement accuracy with which is associated a frame of reference, said optical metrological sensor moreover having no knowledge of the absolute stellar environment, said star sensor and said optical metrological sensor cooperating so that the star sensor can be used to roughly point the optical metrological sensor in a target direction corresponding to a known bright star in the star catalogue, the optical metrological sensor then accurately determining the direction of said known bright star in its own frame of reference, so making it possible to know the target direction with optimized absolute accuracy, corresponding approximately to the measurement accuracy of the optical metrological sensor, within the tolerance of the catalogue accuracy.

Advantageously, the known bright star presents a magnitude that can be 3, 4, 5 or 6.

Advantageously, the optical metrological sensor comprises a set of CCD, CMOS or APS type detectors.

Advantageously, the optical metrological sensor presents an accuracy enabling it to determine a relative position of a target object at 20 meters to within approximately 10 microns, so making it possible to achieve a target angular accuracy less than or equal to approximately 0.1 second of arc.

Advantageously, the calibration of the optical metrological sensor can all be performed on the ground, using an incoherent fibre-connected optical source with a power of the order of a milliwatt.

Advantageously, a satellite can incorporate the absolute target system according to the invention, enabling it to accurately point the observation instrument to a celestial body.

Advantageously, an absolute pointing method can use the absolute target system according to the invention, said star sensor presenting a wide field of view and the optical metrological sensor presenting a detection field and a target axis, characterized in that:
  initially, the star sensor brings the known bright star, chosen as target direction, into the detection field of the optical metrological sensor via any displacement control and application means of said absolute target system, or even, the wide field of view of the star sensor and the detection field of the optical metrological sensor overlap, by appropriate accommodation of said star sensor and optical metrological sensor,
  then, the optical metrological sensor measures the target direction in its own frame of reference,
the accurate knowledge of the target direction corresponding to the known bright star in the frame of reference of the optical metrological sensor and of the absolute position of said known bright star thanks to the star catalogue making it possible to ultimately deduce the absolute target direction accurately.

Advantageously, having a star catalogue on the ground, with an accuracy greater than the catalogue accuracy of the star catalogue incorporated in said previously described absolute target system, it is possible to implement an absolute pointing method, in which said star catalogue on the ground is referred to in order to increase the absolute accuracy concerning the knowledge of the coordinates of said known bright star, so as to increase the accuracy of the absolute target direction.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

Figure 1:
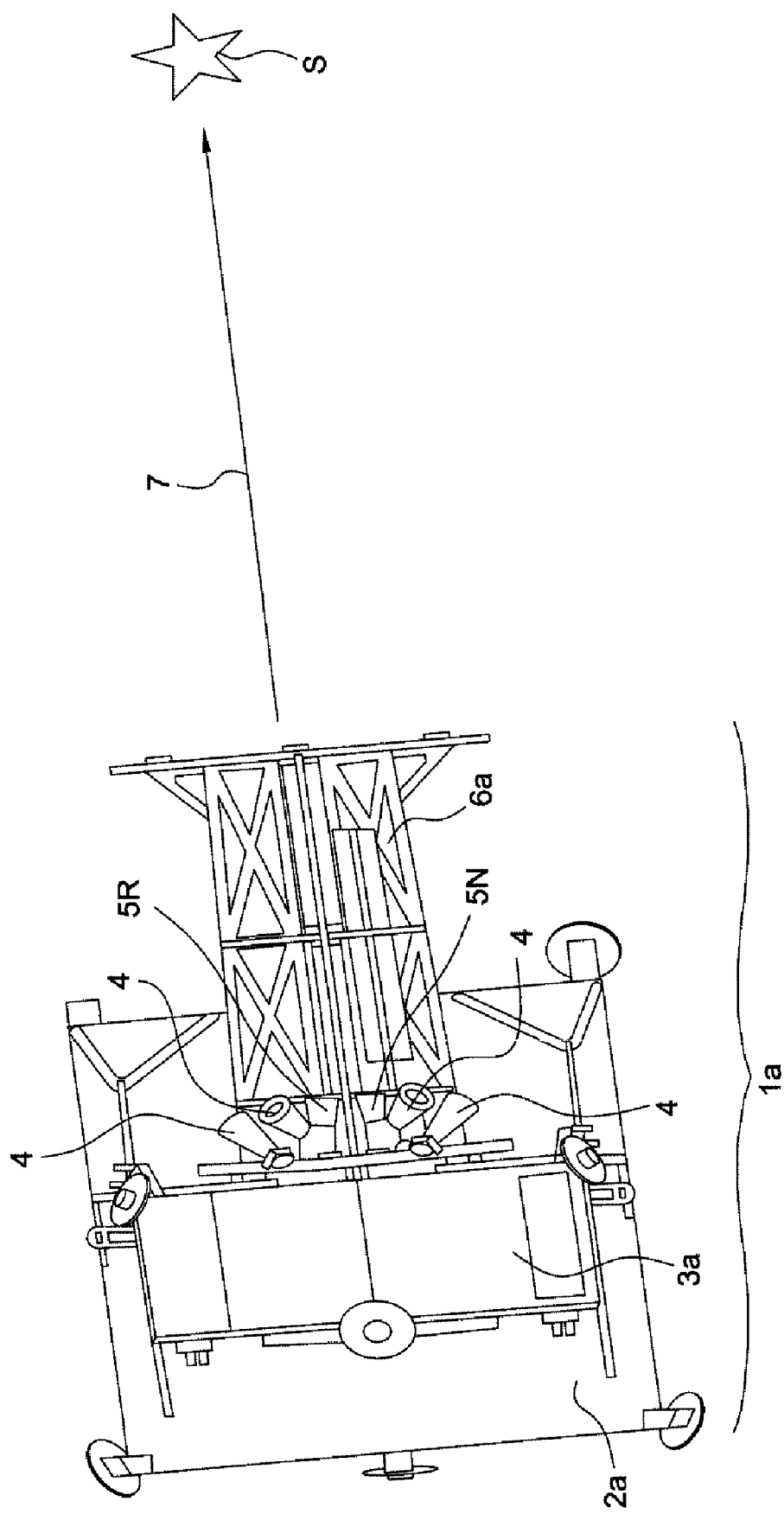
FIG. 1: the illustration of a first example of absolute pointing of a satellite towards a bright star using the device according to the invention.

FIG. 1 is a simple diagram illustrating the absolute pointing of any space instrument 6a onboard a satellite 1a in the direction 7 of a bright star S. This satellite 1a comprises a service module 3a and a solar panel 2a intended to supply all the energy needed for the mission.

Thus, the star sensor, or stellar sensor, comprising in this diagram four "heads" 4, creates a map of a part of the celestial arch using a digital sensor, of CCD or CMOS type, and focussing optics of short focal length and relatively wide field, approximately 20°, which corresponds approximately to a constellation in the celestial arch.

Following this mapping, the stellar sensor stores and digitizes all the stars that it has detected, then an integrated computer determines the target axis of said stellar sensor by calculating its three coordinates using a recognition algorithm and a star catalogue listing the absolute positions of the bright stars in the celestial arch. It is also possible to use an even more accurate ground catalogue if necessary.

Generally, the stars used are of magnitudes 2 to 5 and three or four stars are more often than not sufficient for the algorithm to converge. Moreover, the algorithm generally includes processing operations for minimizing noise and eliminating "false stars". The determination accuracy is of the order of 10 to 20 seconds of arc, these values being average values that vary according to the manufacturers and the technologies employed.

However, the accuracy achieved by the current star sensors, even the most refined, does not reach the accuracy required for certain space missions that are currently envisaged. Consequently, the present invention proposes coupling the previously described stellar sensor with an optical metrological sensor 5N making it possible to accurately determine relative positions.

This optical metrological sensor 5N is backed up by an identical sensor 5R. The specific operation of an accurate optical metrological sensor will be described using FIG. 3 which represents an example of such a sensor.

Figure 2:
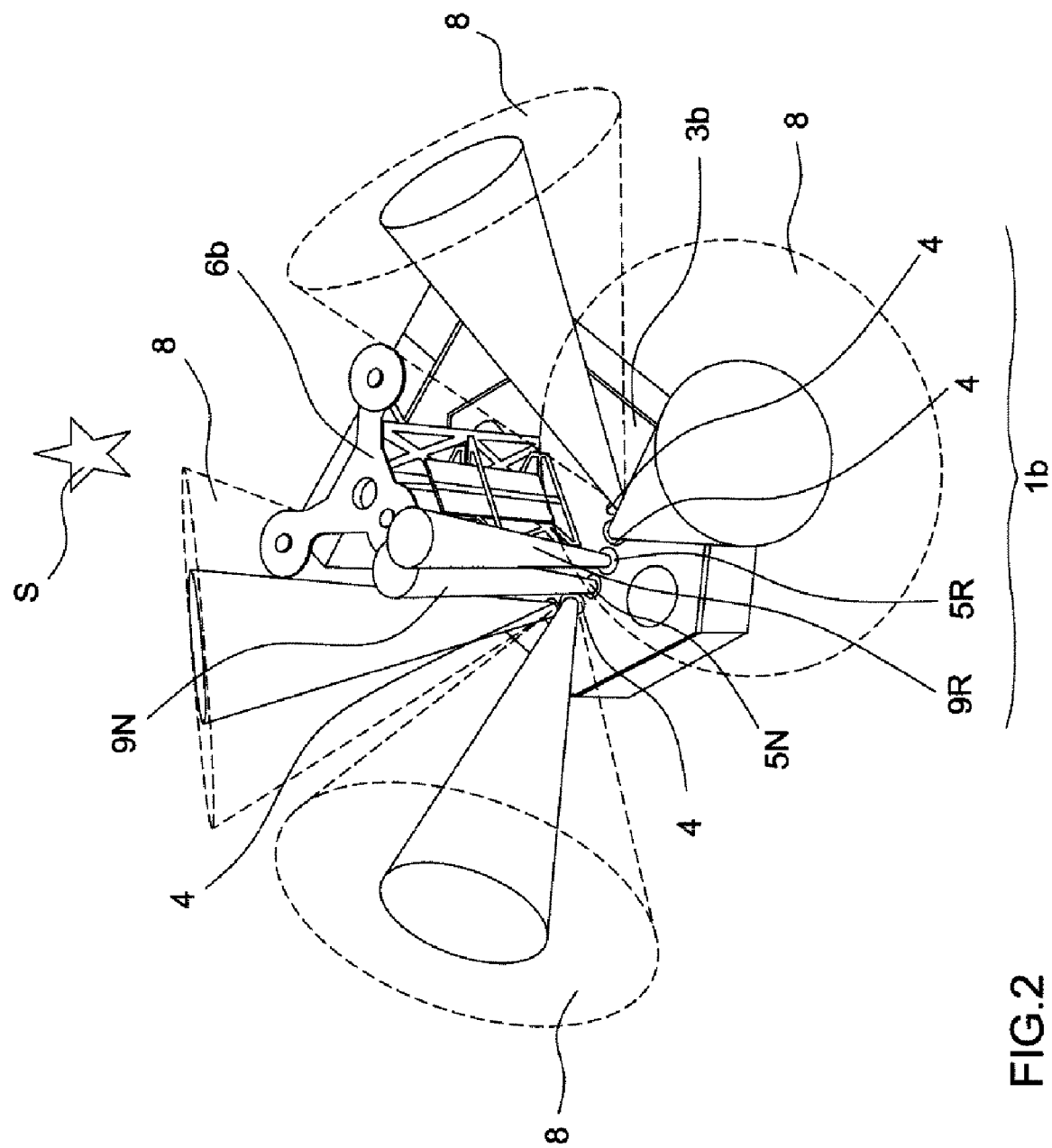
FIG. 2: the theoretical diagram of a second example of absolute target system according to the invention, making it possible to detail the method of implementing the device according to the present patent application.

FIG. 2 represents an example of absolute target system according to the invention, mounted on a satellite 1b comprising a service module 3b and a payload 6b. The principle is therefore to couple a conventional star sensor with its four "heads" 4, to an accurate optical metrological sensor 5N backed up by the sensor 5R. In this example, the fields of view of the four stellar sensors 4 are represented by cones 8, the angle at the summit of which measures approximately 20°. These wide fields of view 8 make it possible to detect numerous known bright stars, whose absolute coordinates appear in the star catalogue to which the star sensor can refer.

The accurate optical metrological sensor 5N is invoked when the star sensor has brought a known bright star S into its detection cone, corresponding to the field of view 9N (9R for the sensor 5R). The optical metrological sensor 5N can then locate the known bright star S in its focal plane with a maximum accuracy. Thus, initially, a bright star S is identified thanks to the star sensors 4; it is known and its coordinates appear in the star catalogue. Through the intermediary of the star sensors 4, it is located absolutely with an average accuracy due to the imperfections of the star sensor, typically at best a few seconds of arc.

Then, said bright star S is located accurately and relatively in the frame of reference of the instrument 6b using the optical metrological sensor 5N. Consequently, the coupling of the star sensor 4 and of the optical metrological sensor 5N makes it possible to bring to the satellite a maximum absolute pointing accuracy, typically 0.1 second of arc. The error is limited to the sum of the error on the relative location of the bright star S targeted by the optical metrological sensor 5N in the frame of reference of the satellite and of the error on the absolute coordinates of the targeted bright star S appearing in the star catalogue.

The star catalogues, and more particularly the bright star catalogues, have very high accuracies, so the absolute accuracy of the system is approximately equal to the relative accuracy of the optical metrological sensor 5N, conventionally at least ten times better than the absolute accuracy of the standard star sensors, such as the stellar sensors 4.

In an example of preferred implementation of the absolute target system according to the invention, it is thus possible to use as optical metrological sensor a device of the type of that described in the French patent application No. FR2902894. This patent application describes a metrology system for the formation flight of satellites making it possible to relatively locate satellites in space.

Generally, in the context of flight of satellites in formation, a measurement of the relative positions of the satellites is required, just like a measurement of the absolute pointing of the satellites to inertial directions, such as the stars. For the relative inter-satellite position measurements, an optical metrological sensor is used. For the absolute pointing measurements, a star sensor is used. The accuracy of the measurement of the relative position metrological sensor is generally far better than the absolute measurement of the star sensor. On the other hand, the metrological sensor has no knowledge of the absolute stellar environment. The object of the invention is to combine these two measurements and the information from the two types of sensor to provide an absolute measurement accuracy of the order of the inter-satellite relative measurement accuracy, and this without adding any extra sensor on board.

Figure 3:
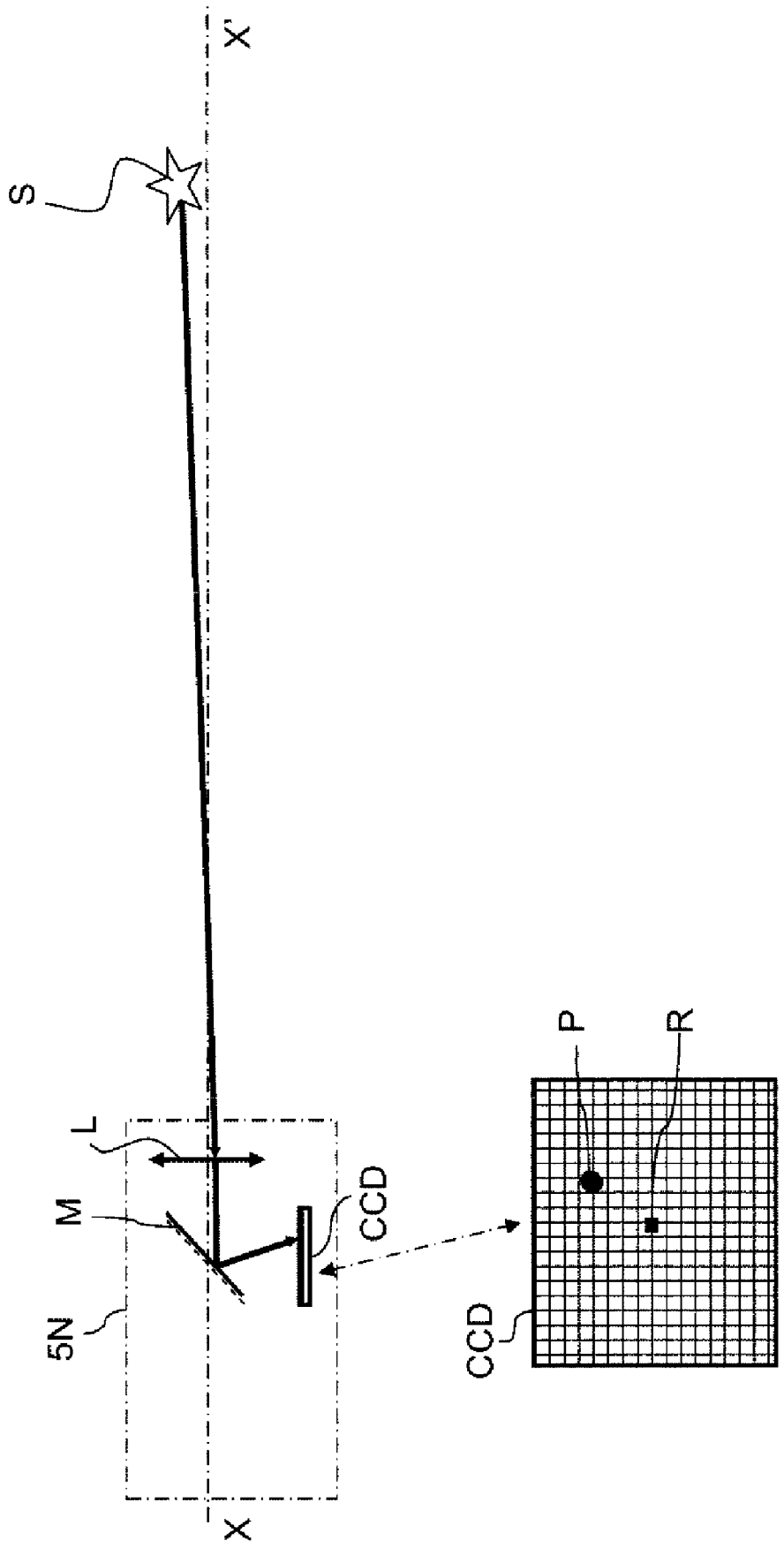
FIG. 3: the diagrammatic representation of an example of optical metrological sensor in the device according to the invention, enabling the application of the present patent application.

FIG. 3 is a highly simplified representation of the operation of such an optical metrological sensor 5N. In the abovementioned patent application, an optical source on board a primary satellite emits a light beam towards a second satellite which reflects the light beam towards the primary satellite. The primary satellite comprises a set of detectors on which is focussed the reflected light beam. It is the measurement of the position of the light spot obtained on the set of detectors that makes it possible to know the relative position of the secondary satellite in relation to the primary satellite. For use in the context of the present invention, the bright star S replaces the optical source reflected by a mirror. The light obtained from said bright star S is focussed using lenses L and mirrors M at a point P on the set of CCD detectors of the optical metrological sensor 5N. Thus, the distance from the point P to the centre R of the CCD detector matrix is measured accurately, and the direction in which the bright star S lies is deduced therefrom relative to the target axis X-X' of the optical metrological sensor 5N in the specific frame of reference of said sensor 5N, therefore in that of the satellite, or of the set of satellites, on which it is mounted. With such an optical metrological sensor 5N, the absolute pointing accuracy of the system according to the invention can reach approximately 0.1 second of arc.

Moreover, such an optical metrological sensor 5N can be fully calibrated on the ground. In practice, an optical source can be used, which will replace the star S in order to perform on the ground the calibration of the optical metrological sensor 5N. This calibration on the ground of such a sensor makes it possible to achieve an accuracy on the position of the optical source of the order of ten or so microns at 20 meters, which well corresponds to an accuracy on the target axis of the order of a tenth of a second of arc.

To sum up, the main advantage of the invention is to make it possible to implement an absolute target system presenting a maximum accuracy, compatible with the accuracies required for the current and future space observation missions. Furthermore, to achieve this result, the invention requires only one star sensor, normally systematically incorporated in the observation satellites, and an optical metrology system, essential to any formation flight mission. The solution proposed in the present patent application is therefore easy to incorporate, and potentially cost-free in terms of equipment weight and cost.

It will be readily seen by one of oridinary skill in the art that the present invention fulfils all of the objects set forth above. After reading the foregoing specification, one of oridinary skill in the art will be able to affect various changes, substitutions of equivalents and various aspects of the invention as broadly disclosed herein. It is therefore intended that the protection granted hereon be limited only be definition contained in the appended claims and equivalents thereof.

The invention claimed is:

1. An absolute target system comprising:
   a star sensor having a catalogue of stars listing a set of known bright stars, whose absolute accuracy is known, with a catalogue accuracy of the catalogue incorporated in the absolute target system,
   an optical metrological sensor to accurately determine relative positions of the bright stars, with a measurement accuracy with which is associated a frame of reference,
   said star sensor and said optical metrological sensor cooperating so that the star sensor can be used to roughly point the optical metrological sensor in a target direction corresponding to a known bright star in the star catalogue, the optical metrological sensor then accurately determining the direction of said known bright star in its own frame of reference, so making it possible to know a target direction with optimized absolute accuracy, corresponding approximately to a measurement accuracy of the optical metrological sensor, within tolerance of the catalogue accuracy.

2. The absolute target system according to claim 1, the known bright star presents a magnitude that can be 3, 4, 5 or 6.

3. The absolute target system according to claim 1, wherein the optical metrological sensor comprises a set of detectors of CCD, CMOS or APS type.

4. The absolute target system according to claim 1, wherein the optical metrological sensor presents an accuracy enabling it to determine a relative position of a target object at 20 meters to within approximately 10 microns, so making it possible to achieve a target angular accuracy less than or equal to approximately 0.1 second of arc.

5. The absolute target system according to claim 1, wherein calibration of the optical metrological sensor is adapted to be performed on the ground, using an incoherent fibre-connected optical source with a power of the order of a milliwatt.

6. Satellite comprising an observation instrument, including the absolute target system according to claim 1, enabling it to accurately point the observation instrument to a celestial body.

7. An absolute pointing method using the absolute target system according to claim 1, said star sensor presenting a wide field of view and the optical metrological sensor presenting a detection field and a target axis, wherein:
   initially, the star sensor brings the known bright star, chosen as target direction, into a detection field of the optical metrological sensor via any displacement control and application means of said absolute target system, or even, the wide field of view of the star sensor and the detection field of the optical metrological sensor overlap, by appropriate accommodation of said star sensor and optical metrological sensor,
   then, the optical metrological sensor measures the target direction in its own frame of reference,
   the accurate knowledge of the target direction corresponding to the known bright star in the frame of reference of the optical metrological sensor and of the absolute position of said known bright star due to the star catalogue making it possible to ultimately deduce the absolute target direction accurately.

8. The method according to claim 7, wherein there is a star catalogue on the ground, with an accuracy greater than the catalogue accuracy of the star catalogues incorporated in said absolute target system, and in that said star catalogue on the ground is referred to in order to increase the absolute accuracy concerning the knowledge of the coordinates of said known bright star, so as to increase the accuracy of the absolute target direction.

* * * * *